(12) United States Patent
Huang et al.

(10) Patent No.: US 9,049,625 B2
(45) Date of Patent: Jun. 2, 2015

(54) ROUTE SWITCHING METHODS AND SYSTEMS

(75) Inventors: Zhigang Huang, Shenzhen (CN); Wei Yan, Shenzhen (CN); Xia Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1378 days.

(21) Appl. No.: 12/541,247

(22) Filed: Aug. 14, 2009

(65) Prior Publication Data

US 2010/0014517 A1    Jan. 21, 2010

Related U.S. Application Data

(63) Continuation of application No. PCT/CN2007/002652, filed on Sep. 5, 2007.

(30) Foreign Application Priority Data

Feb. 15, 2007   (CN) .......................... 2007 1 0063972

(51) Int. Cl.
*H04L 12/28* (2006.01)
*H04W 36/00* (2009.01)
(Continued)

(52) U.S. Cl.
CPC ........ *H04W 36/0033* (2013.01); *H04W 36/023* (2013.01); *H04W 40/36* (2013.01)

(58) Field of Classification Search
CPC ....... H04W 40/248; H04W 8/08; H04W 8/26; H04W 88/182; H04W 36/0033; H04W 40/36; H04W 36/023; H04W 36/00; H04L 61/2521; H04L 29/0653
USPC .................. 370/389, 338, 352, 432, 392, 401
See application file for complete search history.

(56) References Cited

U.S. PATENT DOCUMENTS

2002/0086674 A1   7/2002  Jung
2003/0095523 A1*  5/2003  Korus et al. .................... 370/338

(Continued)

FOREIGN PATENT DOCUMENTS

CN    1394397 A    1/2003
CN    1595912 A    3/2005

(Continued)

OTHER PUBLICATIONS

K. Nishida et al. "Implementation and Evaluation of a Network-Controlled Mobility Management Protocol (IP²MM)," IEEE Communications Society/WCNC 2005, p. 1402-1408.

(Continued)

*Primary Examiner* — Dang Ton
*Assistant Examiner* — Mandish Randhawa
(74) *Attorney, Agent, or Firm* — Leydig, Voit & Mayer, Ltd.

(57) ABSTRACT

A route switching method, when a mobile node is switching between access routers, the method comprises: the second access router sending a context transfer message to the third access router, the third access router updating a Cache for Destination Terminal and a Cache for Source Terminal in a cache of the third access router according to the context transfer message; the second access router updating its cache according to the context transfer message, and updating a Cache for Destination Terminal in a cache of a first access router. Several route switching methods and route switching systems are also involved. Based on the Context Transfer Protocol, it enables the access router to transfer the address information of the mobile node associated with a session connection by the context transfer message directly during the switching, without the process in which the new access router inquires the routing manager, thereby reducing the delay caused by inquiring the routing manager, and thus decreasing the possibility of message lost.

6 Claims, 16 Drawing Sheets

(51) Int. Cl.
*H04W 40/36* (2009.01)
*H04W 36/02* (2009.01)

(56) References Cited

U.S. PATENT DOCUMENTS

| | | | |
|---|---|---|---|
| 2004/0058683 | A1 | 3/2004 | Okagawa |
| 2004/0090937 | A1 | 5/2004 | Chaskar et al. |
| 2004/0240393 | A1* | 12/2004 | Nishida et al. ............ 370/253 |
| 2006/0079234 | A1 | 4/2006 | Ishikawa |
| 2008/0008196 | A1* | 1/2008 | Hong ........................ 370/401 |
| 2009/0225724 | A1 | 9/2009 | Ohbayashi et al. |

FOREIGN PATENT DOCUMENTS

| | | |
|---|---|---|
| CN | 1726727 | 1/2006 |
| CN | 1761362 A | 4/2006 |
| EP | 1 571 869 A2 | 9/2005 |
| EP | 1720363 | 11/2006 |
| WO | WO 03/052962 A1 | 6/2003 |
| WO | WO 2006088340 A1 | 8/2006 |
| WO | WO 2006106846 A1 | 10/2006 |
| WO | WO 2008018150 A1 * | 2/2008 |

OTHER PUBLICATIONS

European Patent Office Communication pursuant to Article 94(3) EPC, European search opinion for Application No. 07800869.5, mailed Jun. 9, 2011, Huawei Technologies C., Ltd (5 pgs.).
Nishida et al., Implementation and Evaluation of a Network-Controlled Mobility Management Protocol (IP²MM): Performance Evaluation Compared with Mobile IPv6, IEEE Communications Society / WCNC 2005 (7 pgs.).
Perkins, IP Encapsulation within IP, XP-002185489, Network Working Group, Request for Comment 2003, Standards Track Category, IBM, Oct. 1996 (14 pgs.).
Written Opinion of the International Searching Authority (translation) dated (mailed) Dec. 13, 2007, issued in related application No. PCT/CN2007/002652, filed Sep. 5, 2007, Huawei Technologies Co., Ltd.
First Office Action dated (mailed) Nov. 6, 2009 issued in related Chinese patent application No. 200710063972.5, Huawei Technologies Co., Ltd.
EP Communication—Supplementary European Search Report dated Jul. 19, 2010, issued in related European application No. 07800869.5, Huawei Technologies Co. Ltd.
Bartolini, N. et al., "A performance analysis of context transfer protocols for QoS enabled internet services", Computer Networks, vol. 50, No. 1, Elsevier Science Publishers B.V., Amsterdam, NL, Jan. 16, 2006, pp. 128-144.
Nishida, K. et al., "Implementation and Evaluation of a Network-Controlled Mobility Management Protocol (IP$^2$MM): Performance Evaluation Compared with Mobile IPv6", Wireless Communications and Networking Conference, 2005 IEEE New Orleans, LA, Mar. 13-17, 2005, IEEE vol. 3, Mar. 13, 2005, pp. 1402-1408.
Bedekar, A. et al., "A Protocol for Network-based Localized Mobility Management; draft-singh-netlmm-protocol-01.txt", IETF Standard Working Draft, Internet Engineering Task Force, No. 1, Feb. 13, 2007, 26 pages.
Loughney, J. et al., "Context Transfer Protocol (CXTP); rfc4067.txt", IETF Standard, Internet Engineering Task Force, Jul. 1, 2005, 33 pages.
Kempf, J. et al., "Problem Description: Reasons for Performing Context Transfers Between Nodes in an IP Access Network; rfc3374.txt", IETF Standard, Internet Engineering Task Force, Sep. 1, 2002, 15 pages.
Johnson et al., "Mobility Support in IPv6," RFC 3775, Network Working Group, The Internet Society (Jun. 2004).
Loughney et al., "Context Transfer Protocol (CXTP)," RFC 4067, Network Working Group, The Internet Society (Jul. 2005).

\* cited by examiner

ROUTE SWITCHING METHODS AND SYSTEMS

CROSS-REFERENCE TO RELATED APPLICATIONS

This application is a continuation of International Application Serial No. PCT/CN2007/002652, filed on Sep. 5, 2007, which claims priority to Chinese Application Serial No. 200710063972.5, filed on Feb. 15, 2007, both of which are hereby incorporated by reference in their entireties.

FIELD OF THE INVENTION

The present invention relates to the Internet Protocol (IP) mobility technique, and more particularly, to methods for optimizing the switching process based on the network, and route switching systems.

BACKGROUND

Currently, the IP mobility is becoming the focus for study. The IP mobility refers to maintaining the continuity of the existing session during movement. In other words, the mobile node changes its attachment point in the Internet without changing the IP address, thereby facilitating the mobile node to communicate with a corresponding node using the local address of the mobile node. There are many existing solutions for the IP mobility, as well as many classification manners. As classified by whether the terminal participating the mobility management process, there are two management manners: the terminal-based mobility management and the network-based mobility management. In the terminal-based mobility management, the terminal detects the mobility and initiates a signaling process to solve the mobility problem. The typical examples include the mobile IPv6 protocol. While in the network-based mobility management, the mobility management is mainly accomplished by the network entity through the signaling interaction process, in which the terminal is not required to participate. The typical examples include the agent mobile IP protocol.

In the prior art, a solution for the terminal-based IP mobility management is provided in Implementation and Evaluation of a Network-Controlled Mobility Management Protocol (IP$^2$/MM): Performance Evaluation Compared with Mobile IPv6. In this terminal-based mobility management scheme, the mobile node (MN), i.e. the terminal, has two addresses: IP-host address (IPha) and IP-routing address (IPra). The IPha uniquely identifies a mobile node as the identifier of the mobile node, while the IPra represents the actual location of the mobile node as the locator of the mobile node.

The architecture of this mobility scheme is as illustrated in FIG. 1. This architecture includes an important mobility management entity, i.e. the Routing Manager (RM), which manages the mapping relations between the IPhas and IPras of the mobile nodes, as well as maintains the session information between the mobile nodes. When the mobile nodes communicate with each other, the transport layer protocol is identified with the IPha, and the IP layer also uses the IPha address as the source and the destination addresses of a message. Taking the entities as illustrated in FIG. 1 as an example, when MN2 sends a message to MN1, the IPha is employed as the IP address in the message. When the message arrives at the access router (AR) 2, AR2 converts the IPha in the message into IPra, and routes the message to AR1 on the opposite end by the IPra. The AR1 further converts the IPra address in the IP header into the IPha address, and then forwards the message to MN1 for processing.

In order to implement the message transfer process above, the ARs at the sending end and the receiving end (AR1 and AR2) each needs to maintain the mapping relations between the IPhas and IPras of the two mobile node (MN1 and MN2). Taking AR1 as an example, AR1 maintains the Cache for Source Terminal (CST) and Cache for Destination Terminal (CDT) of MN1, the CST containing the mapping relation between the IPha and IPra of MN1, while CDT containing the mapping relation between the IPha and IPra of MN2 which is in communication with MN1. Conversely, on AR2, the CST contains the mapping relation between the IPha and IPra of MN2, while the CDT contains the mapping relation between the IPha and IPra of MN1 which is in communication with MN2.

This mobility scheme mainly includes the several processes as follow: terminal activation process, session initiation process, switching process, etc. The terminal activation process and session initiation process will not be repeated here. In this mobility scheme, the process for switching the access routers is as illustrated in FIG. 2, when MN2 switches from AR2 to AR3, the following steps are performed:

Step 101: The data packet sent from MN2 is cached by AR3 first because the CDT of AR3 does not have a cache entry for MN1 when the switching just occurs;

Step 102: MN2 sends an activation message to AR3;

Step 103: AR3 allocates an IPra address to MN2, and notifies the RM of the IPha and the IPra addresses in an Activation Notification (AN) message;

Step 104: The RM updates the IPra address corresponding to MN2 in the cache entry;

Step 105: The RM sends an IP-routing address update (IPra updata, IPU) to AR1, instructing AR1 to update the IPra address corresponding to MN2;

Step 106: AR1 sends an IPU Ack message to the RM after updating the CDT, and the RM returns an IPU message to AR3;

Step 107: AR3 creates the CST about MN2 and the CDT about MN1, containing the IPhas and IPras of MN2 and MN1

Step 108: AR3 returns an Activation Ack message to MN2; and

Step 109: AR3 processes the data packet according to the address mapping in the CST and CDT. The subsequent process is the same as that after a session is established.

During the switching, because neither the AR3 stores the address mapping relations of MN2 and MN1, nor the AR1 stores the new address mapping relation of MN2, the activation process of MN2 is required to update the new address mapping relations of MN2 and MN1 into the cache entries of AR1, AR3 and RM. However, this process has a relatively long delay. It has been mentioned above that the data packet will be cached in AR3 during the switching, however, the data packet may be lost if the cache of AR3 is not enough during the switching.

Furthermore, the RM needs to store the session information between the mobile nodes while storing the address mapping relations between the IPhas and IPras of the mobile nodes. This session information may be used in the switching process for the RM to notify the access router on the opposite end according to the session information. Without the session information and the signaling interaction process, the switching operation may not be achieved. Assuming that there are m mobile nodes in the network, there will be m mapping relations between the IPhas and IPras corresponding to the mobile nodes. Therefore, the session number between the mobile nodes may be on the order of the square of m, far exceeding the number of the mapping relations between the IPhas and IPras stored simple for individual terminals. Thus, it is required that the RM should have a large storage capacity.

SUMMARY

With respect to the disadvantage of the possible message lost during the prior process for switching access routers, the first object of an embodiment of the present invention is to propose a route switching method applicable for the terminal-based mobility management scheme, which is capable of reducing the delay during switching the access routers, so as to avoid the message lost.

With respect to the disadvantage of the possible message lost during the prior process for switching access routers, the second object of an embodiment of the present invention is to propose a route switching method applicable for the network-based mobility management scheme, which is capable of reducing the delay during switching the access routers, so as to avoid the message lost.

With respect to the disadvantage of the possible message lost during the prior process for switching access routers, the third object of an embodiment of the present invention is to propose a route switching system applicable for the terminal-based mobility management scheme, which is capable of reducing the delay during switching the access routers, so as to avoid the message lost.

With respect to the disadvantage of the possible message lost during the prior process for switching access routers, the fourth object of an embodiment of the present invention is to propose a route switching system applicable for the network-based mobility management scheme, which is capable of reducing the delay during switching the access routers, so as to avoid the message lost.

In order to achieve the first object above, a route switching method is proposed according to an embodiment of the present invention. When an access router of a second mobile node is switched from a second access router to a third access router, the method includes the steps of:

sending, by the second access router, a context transfer message to the third access router, the context transfer message comprising an IP-host address of the second mobile node, as well as an IP-host address and IP-routing address of a first mobile node that has established a session connection with the second mobile node;

updating, by the third access router, a Cache for Destination Terminal and a Cache for Source Terminal in a cache of the third access router according to the context transfer message; and updating a Cache for Destination Terminal in a cache of a first access router.

In this embodiment, the Context Transfer Protocol are utilized between the access routers to send the IP-host address and IP-routing address of the first mobile node to the new access router by the context transfer message, so that the third access router does not need to send an acquisition request to the routing manager, thereby reducing the time required for switching, and overcoming the problem of time delay. Thus, the routing manager is no longer required to store the session information. However, the first access router is still unable to acquire the IP-host address and IP-routing address of the second mobile node, and the Cache for Destination Terminal of the first access router must be updated to establish a session connection between the mobile nodes after switching.

In order to achieve the second object above, a route switching method is provided according to an embodiment of the present invention. When an access router of a second mobile node is switched from a second access router to a third access router, the method includes the steps of:

sending, by the second access router, a context transfer message to the third access router, the context transfer message comprising a home address of the second mobile node, as well as a home address and care-of address of a first mobile node that has established a session connection with the second mobile node;

updating, by the third access router, a Cache for Destination Terminal and a Cache for Source Terminal in a cache of the third access router according to the context transfer message; and updating a Cache for Destination Terminal in a cache of a first access router.

This embodiment is applicable for the network-based mobility management scheme, especially in the agent mobile IP technique. It is able to overcome the problem of message lost caused by delay, as well as achieve the route optimization for the messages of the mobile nodes.

In order to achieve the third object above, a route switching system is provided according to an embodiment of the present invention. The system includes: a second access router, configured to send a context transfer message to a third access router when an access router of a second mobile node is switched from the second access router to the third access router, the context transfer message including an IP-host address of the second mobile node, as well as an IP-host address and an IP-routing address of a first mobile node that has established a session connection with the second mobile node; a third access router connected to the second access router, configured to update a Cache for Destination Terminal and a Cache for Source Terminal in a cache of the third access router according to the context transfer message; and a first access router connected to the third access router, configured to update a Cache for Destination Terminal in a cache of the first access router.

In order to achieve the fourth object above, a route switching system is provided according to an embodiment of the present invention. The system includes: a second access router, configured to send a context transfer message to a third access router when an access router of a second mobile node is switched from the second access router to the third access router, the context transfer message including a home address of the second mobile node, as well as a home address and a care-of address of a first mobile node that has established a session connection with the second mobile node; a third access router connected to the second access router, configured to update a Cache for Destination Terminal and a Cache for Source Terminal in a cache of the third access router according to the context transfer message; and a first access router connected to the third access router, configured to update a Cache for Destination Terminal in a cache of the first access router.

An access router is provided according to an embodiment of the present invention. The access router includes: a first notification module, configured to notify a first sending module when an access router of a second mobile node is switched to a third access router; and a first sending module, configured to send a context transfer message to the third access router after receiving the notifications the context transfer message including an IP-host address of the second mobile node, as well as an IP-host address and IP-routing address of a first mobile node that has established a session connection with the second mobile node.

An access router is provided according to an embodiment of the present invention. The access router includes: a second notification module, configured to notify a second sending module when an access router of a second mobile node is switched to a third access router; and a second sending module, configured to send a context transfer message to the third access router after receiving the notification, the context transfer message including a home address of the second mobile node, as well as a home address and a care-of address of a first mobile node that has established a session connection with the second mobile node.

Based on the technical schemes above, the embodiments of the present invention have the advantages below.

1. Based on the Context Transfer Protocol, the access router transfers the IP-host address and IP-routing address of the mobile node associated with a session connection directly by the context transfer message during the switching, without the process in which the new access router inquiries the routing manager, thereby reducing the delay caused by inquiring the routing manager, and thus decreasing the possibility of message lost.

2. The routing manager is only required to store the address information of the mobile nodes associated with a session, without storing the session information, thereby reducing the occupancy on the storage capacity of the routing manager.

BRIEF DESCRIPTION OF THE DRAWING(S)

DETAILED DESCRIPTION

The technical schemes of the present invention are illustrated in further detail below in conjunction with the drawings and embodiments.

In an embodiment of the present invention, the Context Transfer Data packet and Context Transfer Data Reply message of the Context Transfer Protocol (RFC4067) are utilized to transfer the mapping relations between the IPha and IPra of the mobile nodes between the new and old access routers, so that the switching may be accomplished without the new access router inquiring the RM about the mapping relation between the IPha and IPra of MN1. The Context Transfer Protocol described herein is a message format and security mechanism for use by the context transfer, not limited to the methods defined in the RFC4007. Other methods accomplishing the same function are possible.

A route switching method applicable to the terminal-based mobility management scheme is provided according to an embodiment of the present invention, with the basic technical scheme as follow. When the access router of the second mobile node is switched from the second access router to the third access router, the second access router sends a context transfer message to the third access router, the context transfer message containing the IP-host address of the second mobile node, as well as the IP-host address and IP-routing address of a first mobile node that has established a session connection with the second mobile node; the third access router updates the Cache for Destination Terminal and Cache for Source Terminal in its own cache according to the context transfer message; and the Cache for Destination Terminal in the cache of the first access router is updated.

Figure 3:
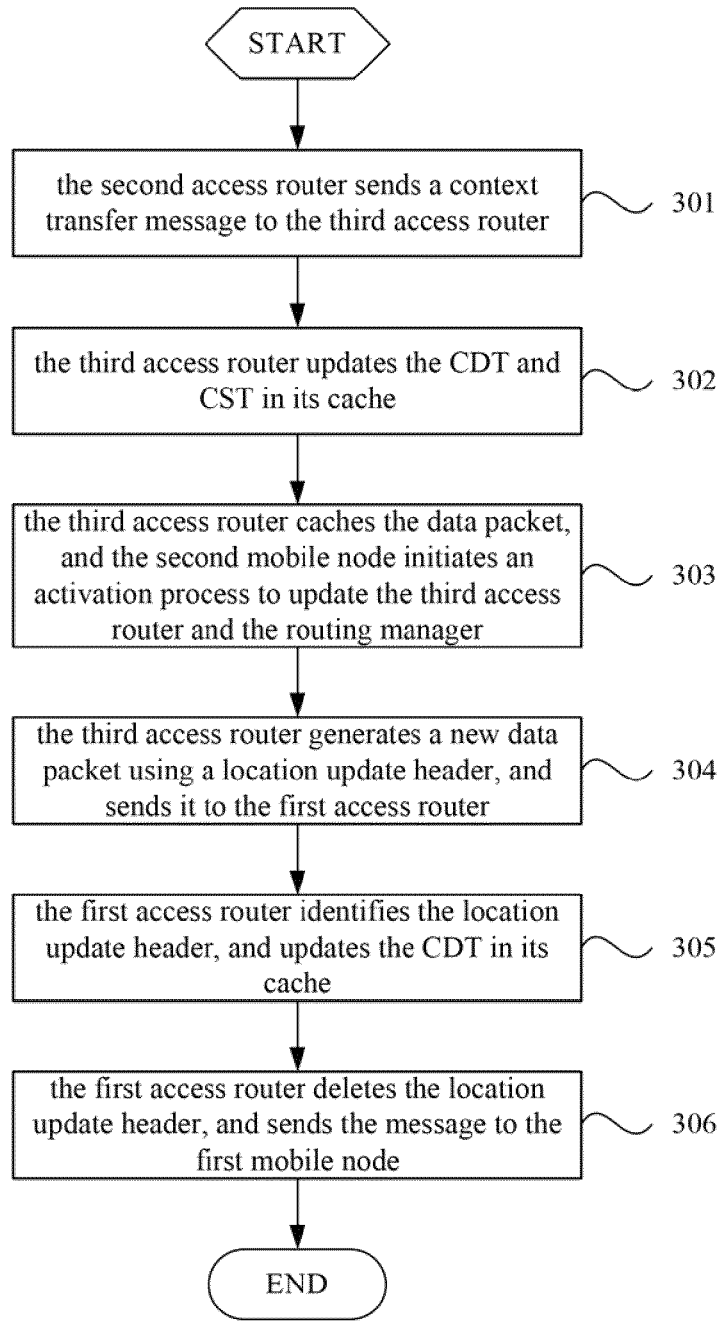
FIG. 3 is a schematic flowchart of a first embodiment of a route switching method according to the present invention.

As shown in FIG. 3, a schematic flowchart of a first embodiment of a route switching method according to the present invention is illustrated. In this embodiment, when the access router of the second mobile node is switched from the second access router to the third access router, the following steps are included.

Step 301: The second access router sends a context transfer message to the third access router, the context transfer message containing the IP-host address of the second mobile node, as well as the IP-host address and IP-routing address of a first mobile node that has established a session connection with the second mobile node.

Step 302: The third access router updates the Cache for Destination Terminal and Cache for Source Terminal in its own cache according to the context transfer message.

Step 303: When the second mobile node sends a data packet to the first mobile node via the third access router, the third access router caches the data packet, and the second mobile node initiates an activation process to update the mapping relation between the IP-routing address and IP-host address of the second mobile node in the third access router and the routing manager.

Step 304: The third access router generates a new data packet according to the cached data packet and a location update header indicating the IP-host address and IP-routing address of the second mobile node, and then sends the new data packet to the first access router.

Step 305: The first access router identifies the location update header in the new data packet, and updates the Cache for Destination Terminal in its own cache according to the location update header.

Step 306: The first access router deletes the location update header from the new data packet, and then sends the message to the first mobile node.

During the switching in this embodiment, the IP-host address of the second mobile node as well as the IP-host address and IP-routing address of a first mobile node that has established a session connection with the second mobile node are sent to the new access router using the context transfer message, without requesting from the routing manager thereby reducing the processing and the time consumed, and thus overcoming the problem of message lost caused by delay.

Because the routing manager will not acquire the information related to the second mobile node in active during the switching, then the first mobile node as the opposite end may not send the data packet to the first mobile node due to the lacking of the address information of the second mobile node. Therefore, the context transfer message is not enough. In step 304 of this embodiment, the location update header is added into the cached data packet, the location update header being capable of indicating the IP-host address and IP-routing address of the second mobile node. After receiving the data packet, the first access router may update its cache according to location update header. Other routers not connected to the mobile node directly may not identify or process the location update header.

The location update header may be added into the header of the data packet only, or added into other appropriate locations. A format for the location update header is given here for reference as in the table below:

| Next Header | Reserved |
| --- | --- |
| Identifier of Terminal (IPha address) | Locator of Terminal (IPra address) |

In the previous embodiment, the mobile nodes employ the IPha address during both sending and receiving the message, and the IPra address is used only when the second access router as the local access router and the first access router as the access router for the opposite end route messages, which means that the IPra address is not required to be known to the mobile nodes, and the IPra address may be only known to the access routers. Therefore, the mobility management scheme applicable in the previous embodiment is simplified in an embodiment of the present invention, so that the mobile node uses only one address, i.e. the IPha address. The IPha address uniquely identifies the mobile node, while the IPra address is represented by the IP address of the access router, or represented by other address information capable of denoting the location of the mobile node.

Figure 4:
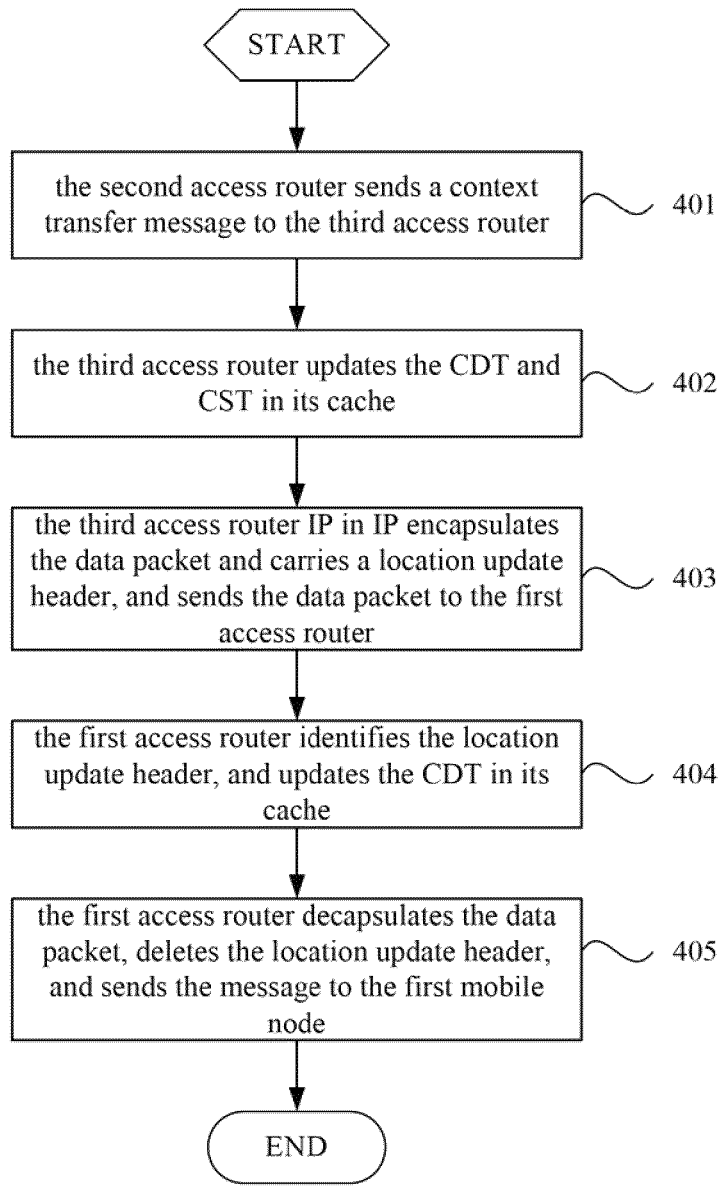
FIG. 4 is a schematic flowchart of a second embodiment of a route switching method according to the present invention.

As illustrated in FIG. 4, a schematic flowchart of a second embodiment of the route switching method according to the present invention is illustrated. When the access router of the second mobile node is switched from the second access router to the third access router, the following steps may be included.

Step 401: The he second access router sends a context transfer message to the third access router, the context transfer message containing the IP-host address of the second mobile node, as well as the IP-host address and IP-routing address of a first mobile node that has established a session connection with the second mobile node.

Step 402: The third access router updates the Cache for Destination Terminal and Cache for Source Terminal in its own cache according to the context transfer message.

Step 403: When the second mobile node sends a data packet to the first mobile node via the third access router, the third access router IP in IP encapsulates the data packet, with the IP-routing address of the first mobile node and the IP-routing address of the second mobile node being the destination address and source address of the outer encapsulation respectively, and with a location update header being used in the outer IP packet, the location update header indicating the IP-host address and IP-routing address of the second mobile node, and then sends the encapsulated data packet to the first access router.

Step 404: The first access router identifies the location update header in the encapsulated data packet, and updates the Cache for Destination Terminal in its own cache according to the location update header.

Step 405: The first access router decapsulates the encapsulated data packet, deletes the location update header, and sends the decapsulated packet to the first mobile node.

Because the IPra address is not used when the mobile node sends the message, the access router does not need to allocate the IPra address for the mobile node. Only when the mobile node accesses to the network, the access router notifies its own IP address to the routing manager as the IPra address, for management by the routing manager. Here, the network access may be an access event on the link layer or on the IP layer, and is typically accomplished upon the network access authentication.

In the prior art, the access router modifies the message sent from the mobile node, changing the address in the IP header from the IPha address to the IPra address. Such method is relatively complex because the changing of the IP address may lead to a series of problems, such as the firewall traversal, re-computing the checksum in the IP packet, etc. When the IPra address is viewed as the address of the access router, the access router may accomplish the route of the message by IP in IP encapsulation, instead of modifying the IP address in the message. As such, the series of problems such as the firewall traversal, re-computing the checksum in the IP packet, etc., may be overcome.

Figure 5:
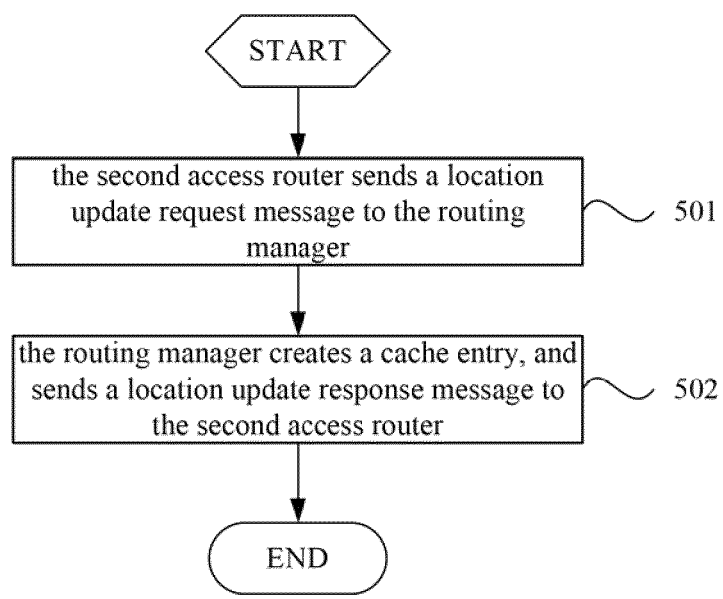
FIG. 5 is a schematic flowchart of a terminal access process of the second embodiment of the route switching method according to the present invention.
Figure 6:
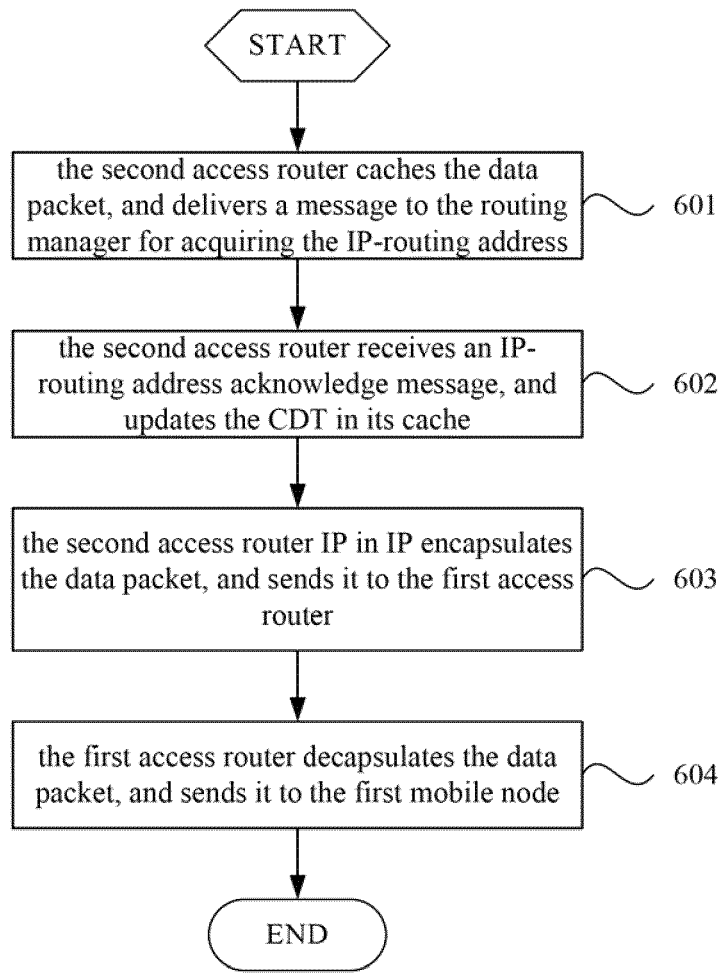
FIG. 6 is a schematic flowchart of a session initiation process of the second embodiment of the route switching method according to the present invention.

Based on this manner in which the mobile node merely uses the IPha address, the process during which the terminal accesses the network is as illustrated in FIG. 5, including the following step.

Step 501: When the second mobile node accesses the network via the second access router, the second access router sends a location update request message to the routing manager, the location update request message including the IP address of the second access router as the IP-routing address of the second mobile node.

Step 502: The routing manager creates a cache entry for the second mobile node in its cache according to the IP-routing address of the second mobile node, and sends a location update response message to the second access router.

After the terminal accesses, the process for establishing a session between the second mobile node and the first mobile node is also different from the prior art. As illustrated in FIG.

6, a schematic flowchart of a session initiation process of the second embodiment of the route switching method according to the present invention is illustrated, including the following steps.

Step 601: When the second mobile node sends a data packet to the first mobile node via the second access router, the second access router caches the data packet, and sends an IP-routing address message to the routing manager for acquiring the IP-routing address of the first mobile node.

Step 602: The second access router receives an IP-routing address acknowledge message returned from the routing manager, and updates the Cache for Destination Terminal in its own cache according to the IP-routing address of the first mobile node in the IP-routing address acknowledge message.

Step 603: The second access router IP in IP encapsulates the data packet, with the IP-routing address of the first mobile node and the IP-routing address of the second mobile node being the destination address and source address of the outer encapsulation, and then sends the encapsulated data packet to the first access router.

Step 604: The first access router decapsulates the encapsulated data packet, and sends the decapsulated packet to the first mobile node.

The processing of the first access router upon receiving a data packet sent from the first mobile node to the second mobile node is the same as above.

Figure 7:
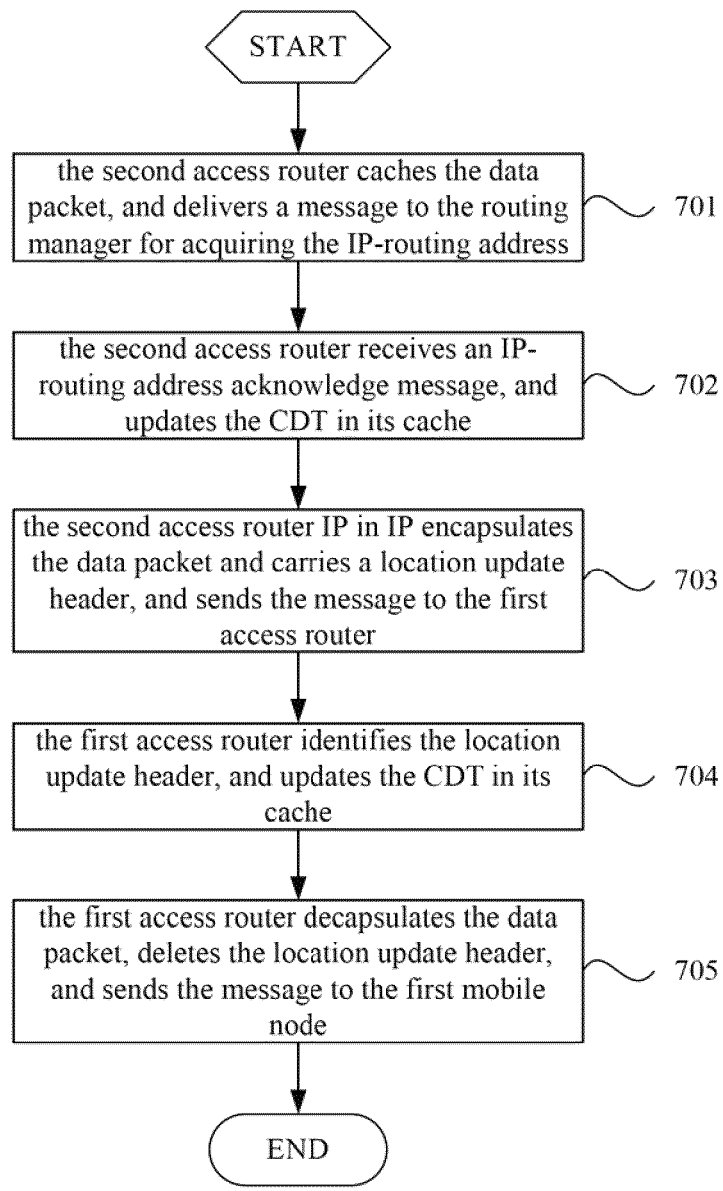
FIG. 7 is a schematic flowchart of another session initiation process of the second embodiment of the route switching method according to the present invention.

In the session initiation process above, the second access router AR2 may use the location update header in the first message sent to the first access router AR1, so that the first access router AR1 may store the relation between the IPha address and IPra address of the second mobile node MN2 after receiving the data packet of MN2 from the second access router AR2. It is unnecessary for the first access router to inquire the information about the second mobile node from the routing manager once again after receiving the data packet sent to MN2 form MN1. The modified process is as illustrated in FIG. 7, which is a schematic flowchart of another session initiation process of the second embodiment of the route switching method according to the present invention, including the following steps.

Step 701: When the second mobile node sends a data packet to the first mobile node via the second access router, the second access router caches the data packet, and sends an IP-routing address message to the routing manager for acquiring the IP-routing address of the first mobile node.

Step 702: The second access router receives an IP-routing address acknowledge message returned from the routing manager, and updates the Cache for Destination Terminal in its own cache according to the IP-routing address of the first mobile node in the IP-routing address acknowledge message.

Step 703: The second access router IP in IP encapsulates the data packet, with the IP-routing address of the first mobile node and the IP-routing address of the second mobile node being the destination address and source address of the outer encapsulation respectively, and with a location update header being used in the outer IP packet, the location update header indicating the IP-host address and IP-routing address of the second mobile node, and then sends the encapsulated data packet to the first access router.

Step 704: The first access router identifies the location update header in the encapsulated data packet, and updates the Cache for Destination Terminal in its own cache according to the location update header.

Step 705: The first access router decapsulates the encapsulated data packet, deletes the location update header, and sends the decapsulated packet to the first mobile node.

Because the access router caches the IPha and IPra information of the local mobile node and the mobile node on the opposite end in communication, the information about the local mobile node will be deleted automatically upon switching or power off, while the information about the mobile node on the opposite end should be deleted after the session is finished. In order to ensure that the cache entry for the IPha and IPra about the mobile node on the opposite end in the access router may be deleted, a time-to-live may be set for the cache entry, which is deleted upon the time-to-live expires.

Because the time-to-live of the cache entry for the mobile node on the opposite end is typically less than the session time, in order to avoid the access router re-inquires the corresponding IPra address from the routing manager after the time-to-live expires, a location inquiry header and a location update header may be employed. The two headers each may be some IP extended header, or some choice in some IP header, or they may be integrated in the same IP extended header or into some choice in some IP header, and the location inquiry and location update may be distinguished by a message type field.

Figure 8:
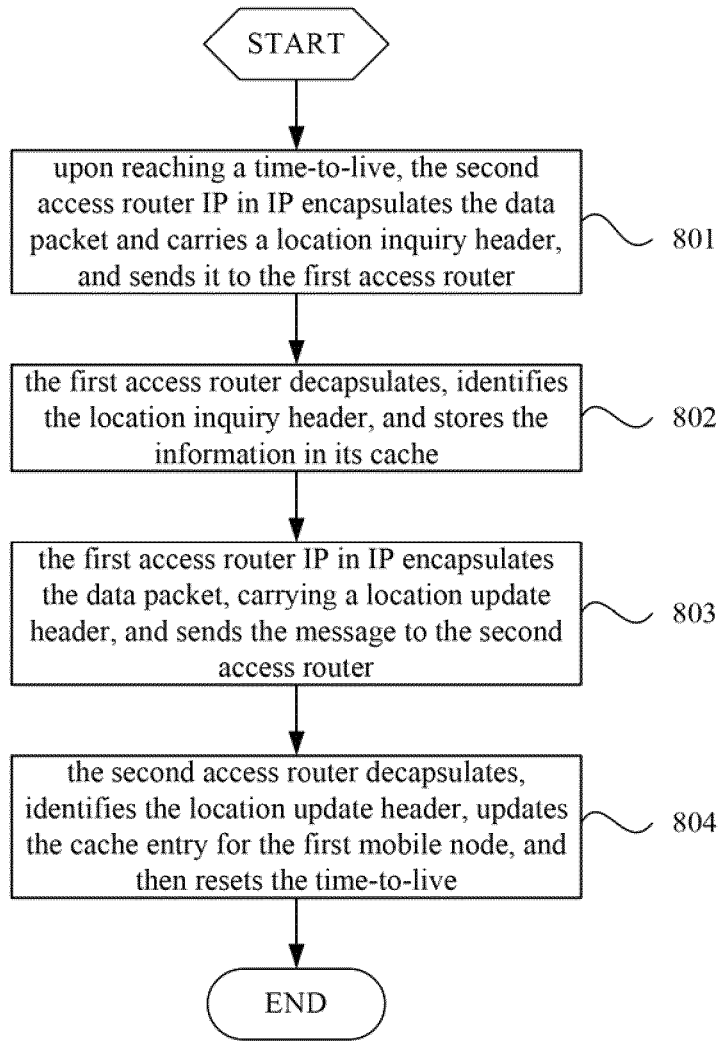
FIG. 8 is a schematic flowchart of a process for updating the information about the node on the opposite end in the cache of the second embodiment of the route switching method according to the present invention.

As illustrated in FIG. 8, a schematic flowchart of a process for updating the information about the node on the opposite end in the cache of the second embodiment of the route switching method according to the present invention is illustrated, including the following steps.

Step 801: When the cache entry for the first mobile node stored in the second access router is going to reach the time-to-live, the second access router receives a data packet sent from the second mobile node, IP in IP encapsulates the data packet, with the IP-routing address of the first mobile node and the IP-routing address of the second mobile node being the destination address and source address of the outer encapsulation respectively, and with a location inquiry header being used in the outer IP packet, the location inquiry header including the IP-host address of the first mobile node for inquiring the corresponding IP-routing address of the first mobile node, and then sends the encapsulated data packet to the first access router.

Step 802: The first access router decapsulates the encapsulated data packet, identifies the location inquiry header in the encapsulated data packet, and stores the information in the location inquiry header in its cache.

Step 803: When the first mobile node sends a data packet to the second mobile node via the first access router, the first access router IP in IP encapsulates the data packet, with the IP-routing address of the second mobile node and the IP-routing address of the first mobile node being the destination address and source address respectively, and with a location update header being used in the outer IP packet, the location update header including the current IP-host address and IP-routing address of the first mobile node, clears the location inquiry information stored in its cache, and then sends the encapsulated data packet to the second access router.

Step 804: The second access router decapsulates the encapsulated data packet, identifies the location update header in the encapsulated data packet, updates the cache entry for the first mobile node in its own cache, and then resets the time-to-live.

In the second embodiment, the routing manager is no longer required to record the session information, but rather to update and provide the address mapping relation of the mobile node, thus the processing burden on the routing manager may be greatly reduced. The routing manager here is a logical name. For an actual physical device, the routing manager may be a Home Location Register (HLR) in a mobile network, or a Domain Name System Server (DNS Server) in a fixed network. If the DNS Server is employed as the routing manager, then in this embodiment, the signaling between the access router and the routing manager may be achieved with the DNS signaling.

All the methods for network access, session initiation, switching process, cache deletion and update above in which the mobile nodes only utilize the IPha addresses may be applied to the agent mobile IP. The IPha address may correspond to the Home Address (HoA) of a mobile node, the IPra address may correspond to the Care-of Address (CoA) of the mobile node, and the routing manager may correspond to a set of Home Agents (HA). The location update request message and location update response message during the network access may be achieved by extending the registration request message and the registration response message of the mobile IPv4, or may be achieved by extending the binding update, agent binding response of the mobile IPv6.

A route switching method applicable for the network-based mobility management scheme is also provided according to an embodiment of the present invention, with the basic technical scheme as follow. When the access router of the second mobile node is switched from the second access router to the third access router, the second access router sends a context transfer message to the third access router, the context transfer message including the home address of the second mobile node, as well as the home address and care-of address of a first mobile node that has established a session connection with the second mobile node; the third access router updates the Cache for Destination Terminal and Cache for Source Terminal in its own cache according to the context transfer message; and the Cache for Destination Terminal in the cache of the first access router is updated.

Figure 9:
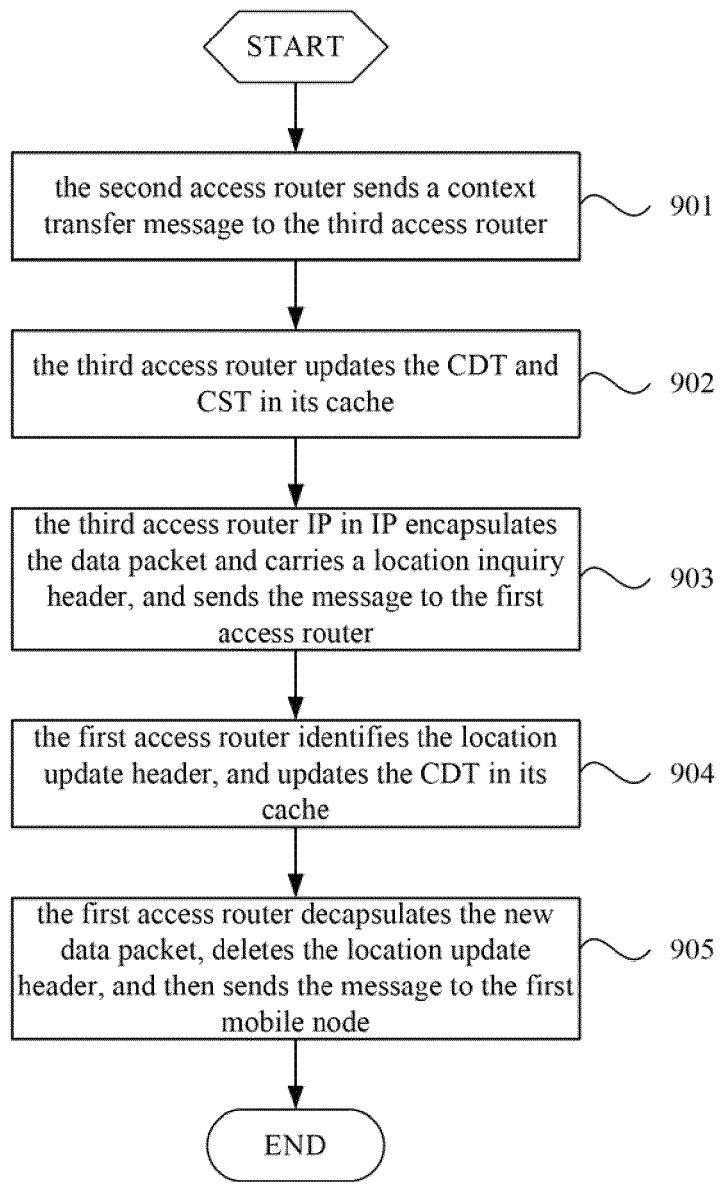
FIG. 9 is a schematic flowchart of a third embodiment of a route switching method according to the present invention.

As shown in FIG. 9, a schematic flowchart of a third embodiment of a route switching method according to the present invention is illustrated, including the following steps when the access router of the second mobile node is switched from the second access router to the third access router.

Step 901: The second access router sends a context transfer message to the third access router, the context transfer message including the home address of the second mobile node, as well as the home address and care-of address of a first mobile node that has established a session connection with the second mobile node.

Step 902: The third access router updates the Cache for Destination Terminal and Cache for Source Terminal in its own cache according to the context transfer message.

Step 903: When the second mobile node sends a data packet to the first mobile node via the third access router, the third access router IP in IP encapsulates the data packet, with the care-of address of the first mobile node and the care-of address of the second mobile node being the destination address and source address of the outer encapsulation respectively, and with a location update header being used in the outer IP packet, the location update header indicating the home address and care-of address of the second mobile node, and then sends the encapsulated data packet to the first access router.

Step 904: The first access router identifies the location update header in the encapsulated data packet, and updates the Cache for Destination Terminal in its own cache according to the location update header.

Step 905: The first access router decapsulates the encapsulated data packet, deletes the location update header, and then sends the decapsulated packet to the first mobile node.

In this embodiment, the care-of address is not used when the mobile node sends a message, thus the access router does not need to allocate the care-of address for the mobile node.

Only when the mobile node accesses the network, the access router instructs its own IP address to the home agent as the care-of address. Here, the network access may be an access event on the link layer or on the IP layer, and is typically accomplished upon the network access authentication.

Figure 10:
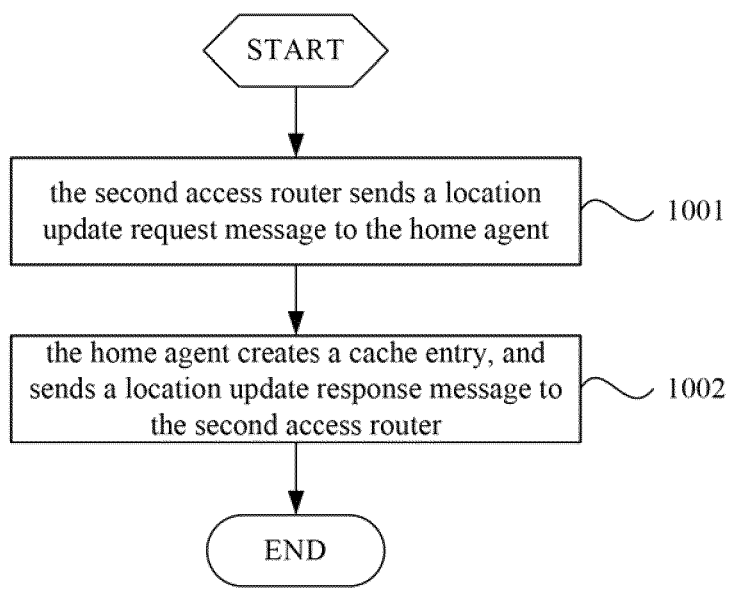
FIG. 10 is a schematic flowchart of a terminal access process of the third embodiment of the route switching method according to the present invention.
Figure 11:
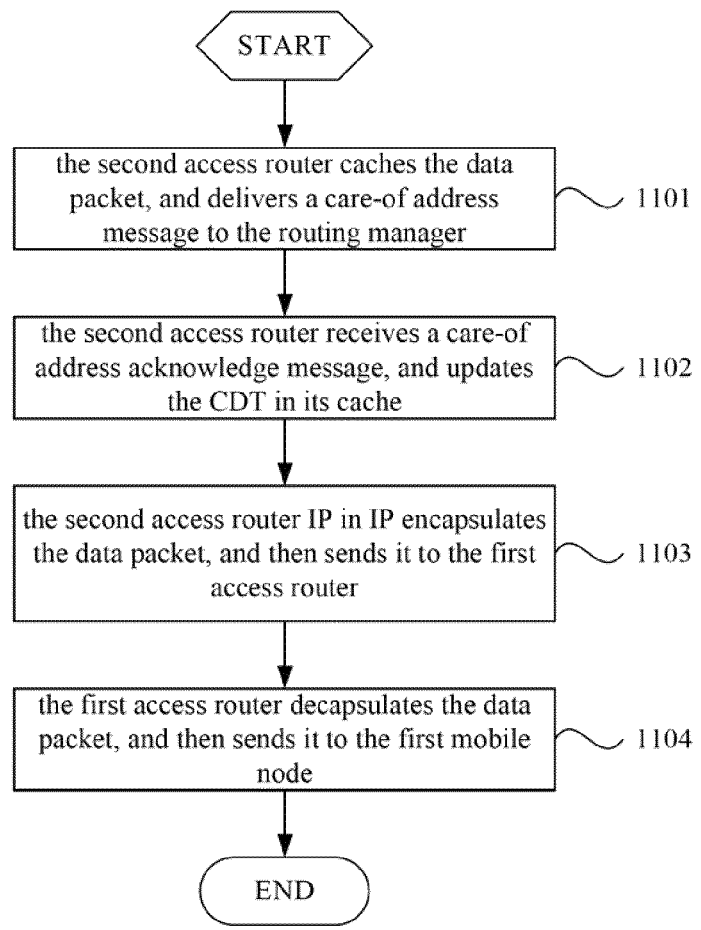
FIG. 11 is a schematic flowchart of a session initiation process of the third embodiment of the route switching method according to the present invention.

A way of accessing the network is also provided in this embodiment as illustrated in FIG. 10, which is a schematic flowchart of a terminal access process of the third embodiment of the route switching method according to the present invention, including the following steps.

Step 1001: When the second mobile node accesses the network via the second access router, the second access router sends a location update request message to the home agent, the location update request message including the IP address of the second access router as the care-of address of the second mobile node.

Step 1002: The home agent creates a cache entry for the second mobile node in its cache according to the care-of address of the second mobile node, and sends a location update response message to the second access router.

Figure 1:
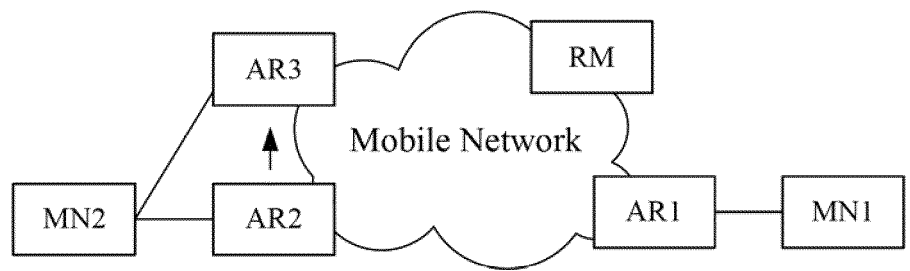
FIG. 1 is a schematic diagram of an terminal-based mobility management architecture in the prior art.
Figure 2:
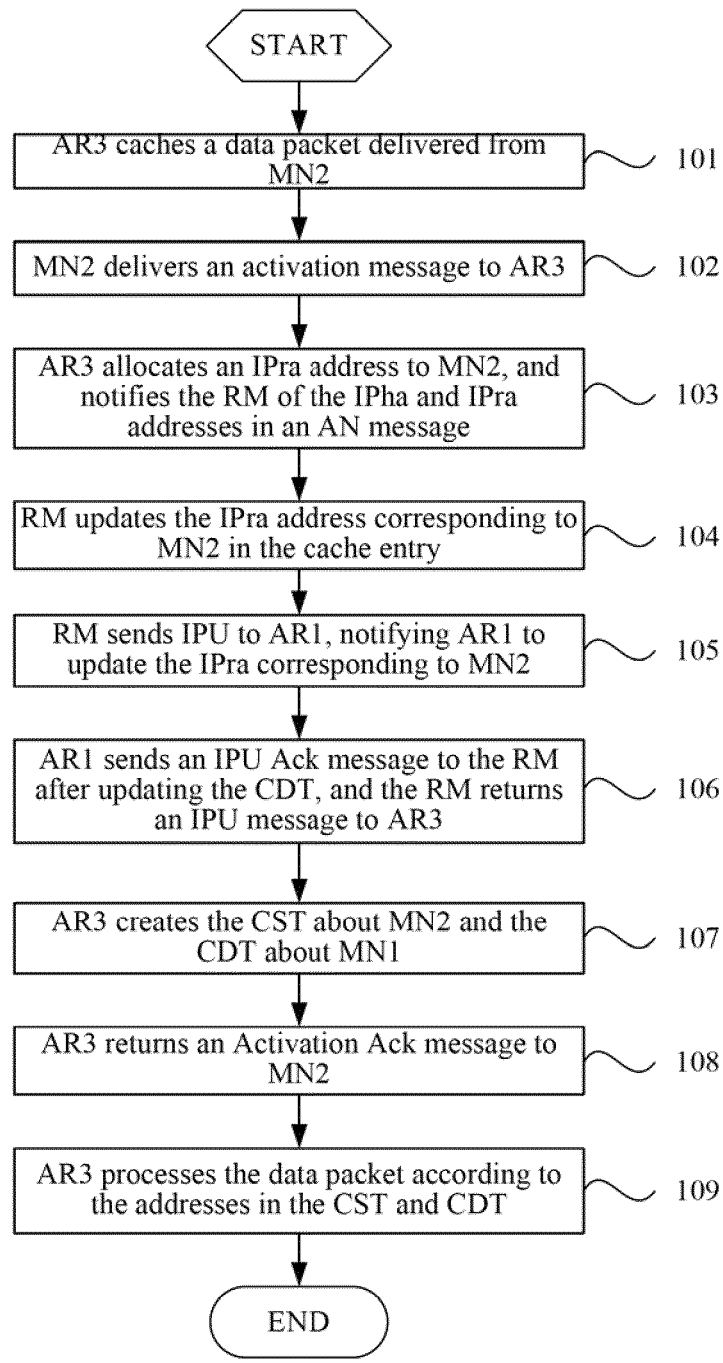
FIG. 2 is a schematic flowchart of route switching in the prior art.

As illustrated in FIG. 1, a schematic flowchart of a session initiation process of the third embodiment of the route switching method according to the present invention is illustrated, including the following steps.

Step 1101: When the second mobile node sends a data packet to the first mobile node via the second access router, the second access router caches the data packet, and sends a care-of address message to the home agent for acquiring the care-of address of the first mobile node.

Step 1102: The second access router receives a care-of address acknowledge message returned from the home agent, and updates the Cache for Destination Terminal in its own cache according to the care-of address of the first mobile node in the care-of address acknowledge message.

Step 1103: The second access router IP in IP encapsulates the data packet, with the care-of address of the first mobile node and the care-of address of the second mobile node being the destination address and source address of the outer encapsulation respectively, and then sends the encapsulated data packet to the first access router.

Step 1104: The first access router decapsulates the encapsulated data packet, and then sends the decapsulated packet to the First mobile node.

The processing of the first access router upon receiving a data packet from the first mobile node to the second mobile node is the same as above.

Figure 12:
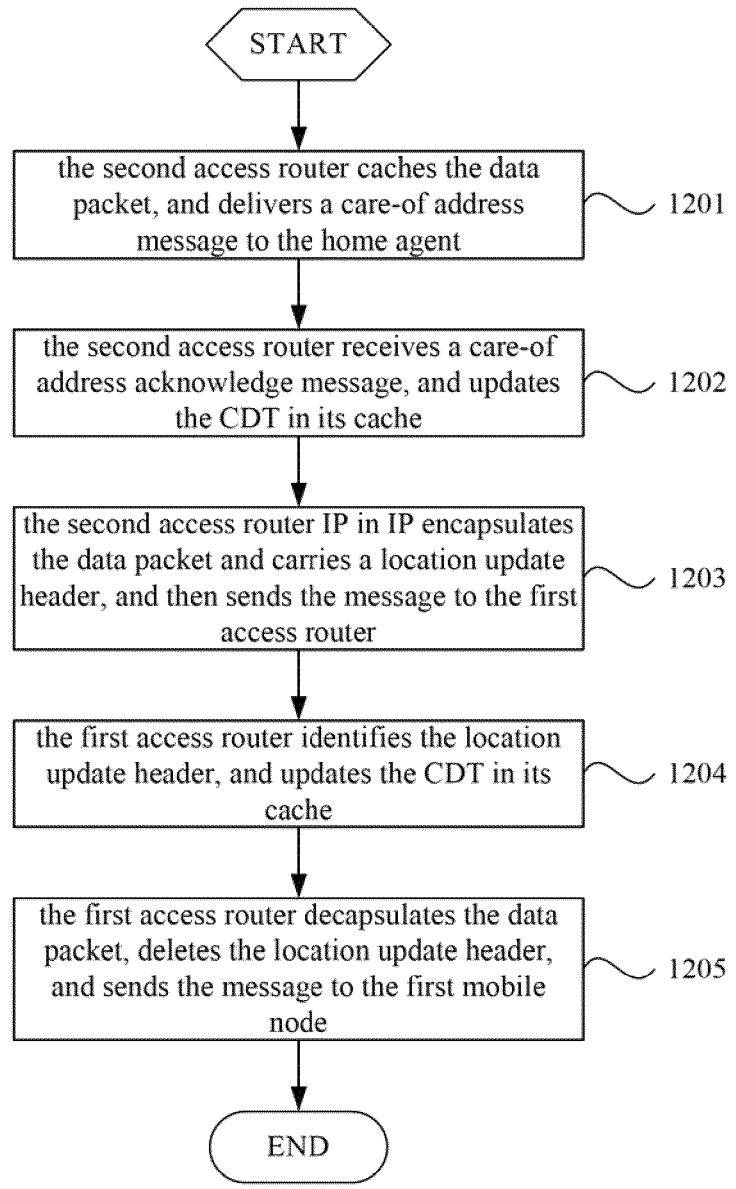
FIG. 12 is a schematic flowchart of another session initiation process of the third embodiment of the route switching method according to the present invention.

As illustrated in FIG. 12, a schematic flowchart of another session initiation process of the third embodiment of the route switching method according to the present invention is illustrated, including the following steps.

Step 1201: When the second mobile node sends a data packet to the first mobile node via the second access router, the second access router caches the data packet, and sends a care-of address message to the home agent for acquiring the care-of address of the first mobile node.

Step 1202: The second access router receives a care-of address acknowledge message returned from the home agent, and updates the Cache for Destination Terminal in its own cache according to the care-of address of the first mobile node in the care-of address acknowledge message.

Step 1203: The second access router IP in IP encapsulates the data packet, with the care-of address of the first mobile node and the care-of address of the second mobile node being the destination address and source address of the outer encapsulation respectively, and with a location update header being used in the outer IP packet, the location update header indicating the home address and care-of address of the second mobile node, and then sends the encapsulated data packet to the first access router.

Step 1204: The first access router identifies the location update header in the encapsulated data packet, and updates the Cache for Destination Terminal in its own cache according to the location update header.

Step 1205: The first access router decapsulates the encapsulated data packet, deletes the location update header, and then sends the decapsulated packet to the first mobile node.

Both of the two access manners above enable the access router to store the mapping relation between the HoA and CoA, so that the access router may transmit directly during the subsequent session without through the home agent, thereby optimizing the route between the mobile nodes.

Because the access router caches the address information of the local mobile node and the mobile node on the opposite end in communication, the information about the local mobile node will be deleted automatically upon switching or power off, while the information about the mobile node on the opposite end should be deleted after the session is finished. Because the time-to-live of the cache entry for the mobile node on the opposite end is typically less than the session time, in order to avoid the access router re-inquires the corresponding IPra address from the home agent after the time-to-live expires, a location inquiry header and location update header may be employed. The two headers each may be some IP extended header, or some choice in some IP header, or they may be integrated in the same IP extended header or into some choice in some IP header, and the location inquiry and location update may be distinguished by a message type field.

Figure 13:
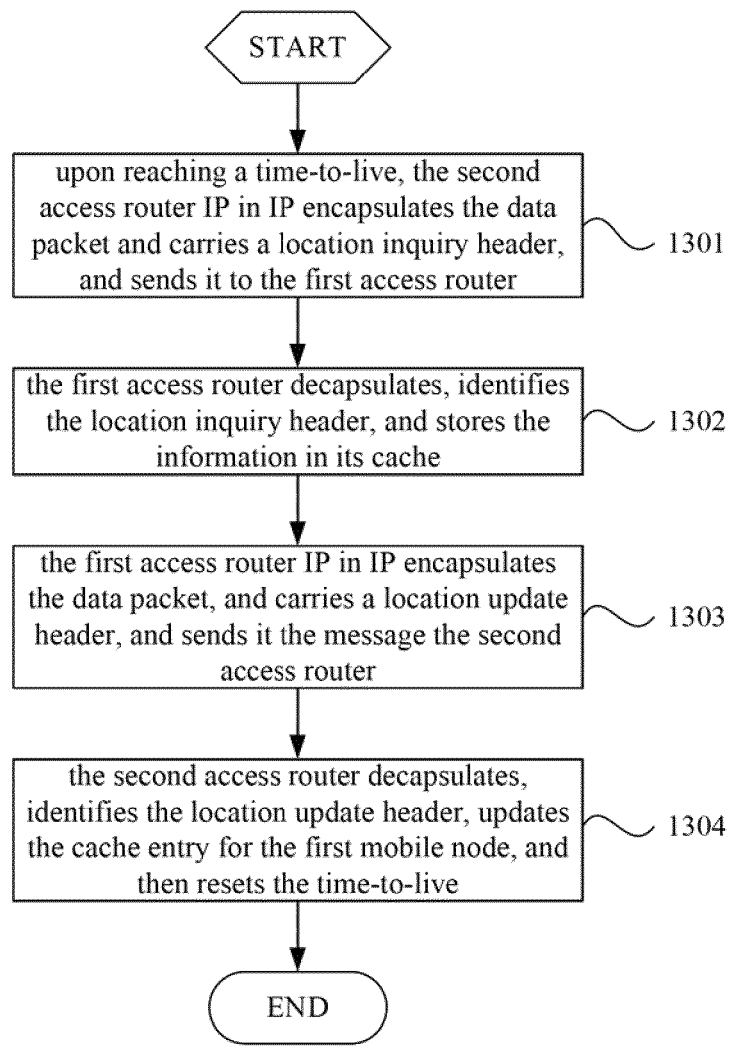
FIG. 13 is a schematic flowchart of a process for updating the information about the node on the opposite end in the cache of the third embodiment of the route switching method according to the present invention.

As illustrated in FIG. 13, a schematic flowchart of a process for updating the information about the node on the opposite end in the cache of the third embodiment of the route switching method according to the present invention is illustrated, including the following steps.

Step 1301: When the cache entry for the first mobile node stored in the second access router is going to reach the time-to-live, the second access router receives a data packet sent from the second mobile node, IP in IP encapsulates the data packet, with the care-of address of the first mobile node and the care-of address of the second mobile node being the destination address and source address of the outer encapsulation respectively, and with a location inquiry header being used in the outer IP packet, the location inquiry header including the home address of the first mobile node for inquiring the corresponding care-of address of the first mobile node, and then sends the encapsulated data packet to the first access router.

Step 1302: The first access router decapsulates the encapsulated data packet, identifies the location inquiry header in the encapsulated data packet, and stores the information in the location inquiry header in its cache.

Step 1303: When the first mobile node sends a data packet to the second mobile node via the first access router, the first access router IP in IP encapsulates the data packet, with the care-of address of the second mobile node and the care-of address of the first mobile node being the destination address and source address respectively, and with a location update header being used in the outer IP packet, the location update header including the current home address and care-of address of the first mobile node, clears the location inquiry information stored in its own cache, and then sends the encapsulated data packet to the second access router.

Step 1304: The second access router decapsulates the encapsulated data packet, identifies the location update header in the encapsulated data packet, updates the cache entry for the first mobile node in its own cache, and then resets the time-to-live.

Figure 14:
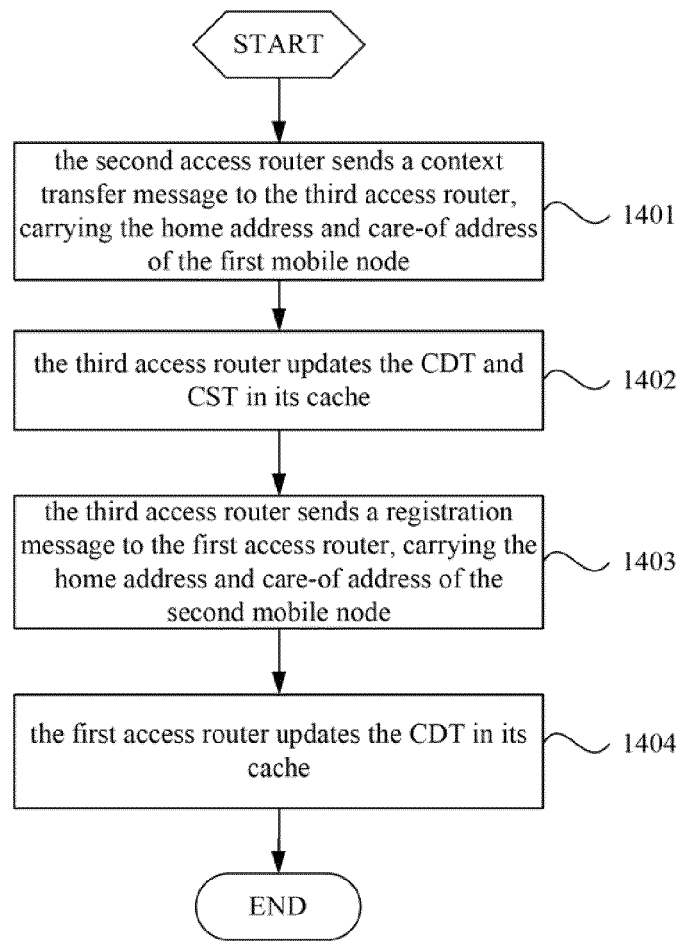
FIG. 14 is a schematic flowchart of a fourth embodiment of a route switching method according to the present invention.

As illustrated in FIG. 14, a schematic flowchart of a fourth embodiment of a route switching method according to the present invention is illustrated. In this embodiment, instead of the location update header, a registration message is used to send the home address and care-of address of the second mobile node. When the access router of the second mobile node is switched from the second access router to the third access router, the following steps are included.

Step 1401: The second access router sends a context transfer message to the third access router, the context transfer message including the home address of the second mobile node, as well as the home address and care-of address of a first mobile node that has established a session connection with the second mobile node.

Step 1402: The third access router updates the Cache for Destination Terminal and Cache for Source Terminal in its own cache according to the context transfer message.

Step 1403: The third access router sends a registration message to the first access router, the registration message carrying the home address and care-of address of the second mobile node.

Step 1404: The first access router updates the Cache for Destination Terminal in its own cache according to the home address and care-of address of the second mobile node in the registration message.

In this embodiment, the address information of the mobile node is transferred in the manner of signaling (registration message) without encapsulating the location update header into the data packet. Therefore, it is much more flexible in implementation.

Figure 15:
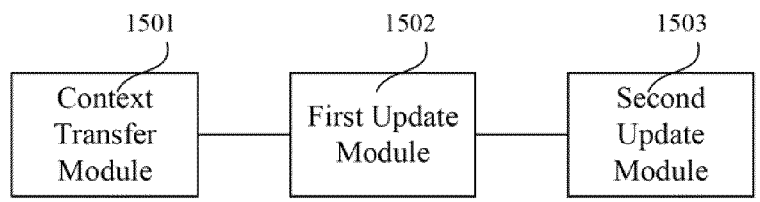
FIG. 15 is a schematic block diagram of a first embodiment of a route switching system according to the present invention.

As illustrated in FIG. 15, a schematic block diagram of a first embodiment of a route switching system according to the present invention is illustrated. The system includes: a context transfer module 1501, a first update module 1502 and a second update module 1503. The context transfer module 1501 is configured to enable the second access router to send a context transfer message to the third access router when the access router of the second mobile node is switched from the second access router to the third access router, the context transfer message including the IP-host address of the second mobile node, as well as the IP-host address and IP-routing address of a first mobile node that has established a session connection with the second mobile node. The first update module 1502 is connected to the context transfer module, and updates the Cache for Destination Terminal and Cache for Source Terminal in the cache of the third access router according to the context transfer message when the third access router receives the context transfer message. The second update module 1503 is connected to the first update module 1502, and is able to update the Cache for Destination Terminal in the cache of the first access router.

This embodiment is applicable for the terminal-based mobility management scheme. Based on the Context Transfer Protocol, it enables the access router to transfer the address information of the mobile node associated with a session connection by the context transfer message directly during the switching, without the process in which the new access router inquires the routing manager, thereby reducing the delay caused by inquiring the routing manager, and thus decreasing the possibility of message lost.

Figure 16:
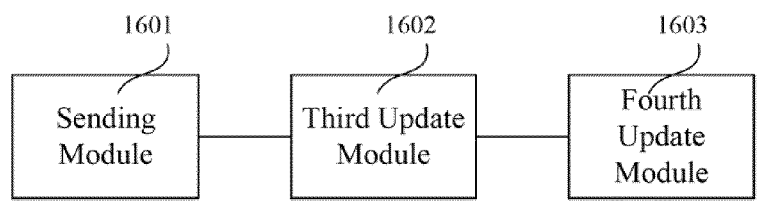
FIG. 16 is a schematic block diagram of a second embodiment of a route switching system according to the present invention.

As illustrated in FIG. 16, a schematic block diagram of a second embodiment of a route switching system according to the present invention is illustrated. The system includes: a sending module 1601, a third update module 1602 and a fourth update module 1603. The sending module 1601 is configured to enable the second access router to send a context transfer message to the third access router when the access router of the second mobile node is switched from the second access router to the third access router, the context transfer message including the home address of the second mobile node, as well as the home address and care-of address of a first mobile node that has established a session connection with the second mobile node. The third update module 1602 is connected to the sending module 1601, and may update the Cache for Destination Terminal and Cache for Source Terminal in the cache of the third access router according to the context transfer message. The fourth update module 1603 is connected to the third update module 1602, and is configured to update the Cache for Destination Terminal in the cache of the first access router.

Figure 17:
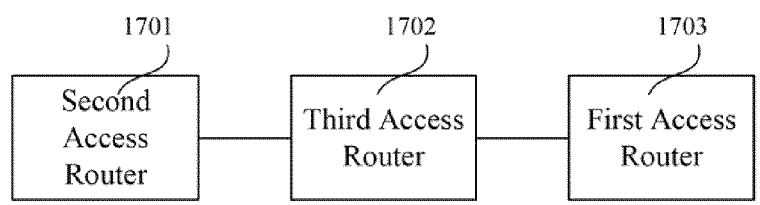
FIG. 17 is a first schematic block diagram of a route switching system according to an embodiment of the present invention.

As illustrated in FIG. 17, a first schematic block diagram of a route switching system according to an embodiment of the present invention is illustrated. The system includes: a second access router 1701, a third access router 1702 and a first access router 1703.

The second access router 1701 is configured to send a context transfer message to the third access router 1702 when the access router of the second mobile node is switched from the second access router 1701 itself to the third access router 1702, the context transfer message including the Internet Protocol (IP)-host address of the second mobile node, as well as the IP-host address and IP-routing address of a first mobile node that has established a session connection with the second mobile node.

The third access router 1702 is connected to the second access router 1701, and is configured to update the Cache for Destination Terminal and Cache for Source Terminal in its own cache according to the context transfer message.

The first access router 1703 is connected to the third access router 1702, and is configured to update the Cache for Destination Terminal in its own cache.

Figure 18:
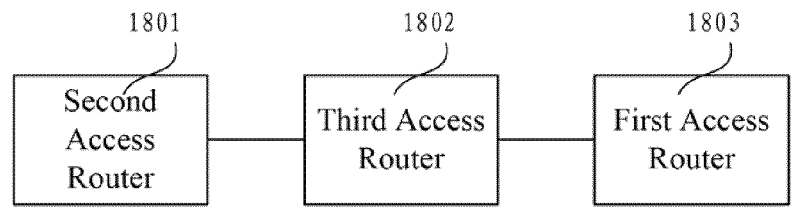
FIG. 18 is a second schematic block diagram of a route switching system according to an embodiment of the present invention.

As illustrated in FIG. 18, a second schematic block diagram of a route switching system according to an embodiment of the present invention is illustrated. The system includes: a second access router 1801, a third access router 1802 and a first access router 1803.

The second access router 1801 is configured to send a context transfer message to the third access router 1802 when the access router of the second mobile node is switched from the second access router 1801 itself to the third access router, the context transfer message including the home address of the second mobile node, as well as the home address and care-of address of a first mobile node that has established a session connection with the second mobile node.

The third access router 1802 is connected to the second access router 1801, and is configured to update the Cache for Destination Terminal and Cache for Source Terminal in its own cache according to the context transfer message.

The first access router 1803 is connected to the third access router 1802, and is configured to update the Cache for Destination Terminal in its own cache.

Figure 19:
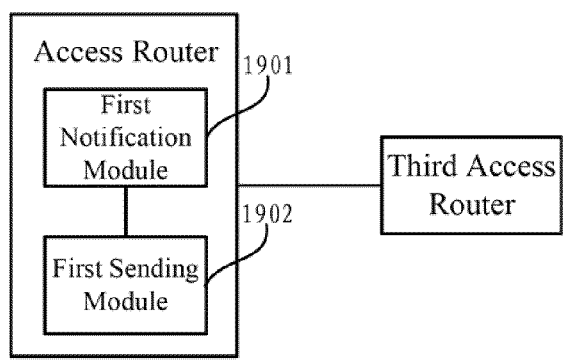
FIG. 19 is a first schematic block diagram of an access router according to an embodiment of the present invention.

As illustrated in FIG. 19, a first schematic block diagram of an access router according to an embodiment of the present invention is illustrated. The access router includes: a first notification module 1901 and a first sending module 1902.

The first notification module 1901 is configured to notify the first sending module 1902 when the access router of the second mobile node is switched to the third access router.

Figure 20:
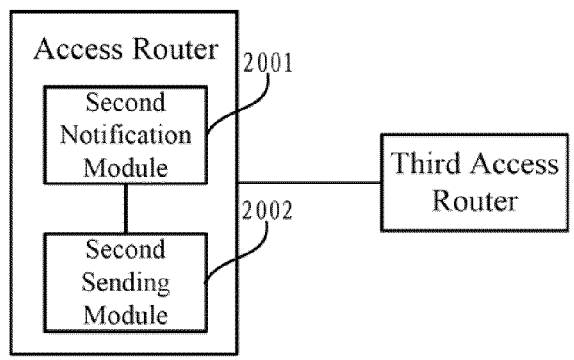
FIG. 20 is a second schematic block diagram of an access router according to an embodiment of the present invention.

The first sending module 1902 is configured to send a context transfer message to the third access router after receiving the notification, the context transfer message including the Internet Protocol (IP)-host address of the second mobile node, as well as the IP-host address and IP-routing address of a first mobile node that has established a session connection with the second mobile node;

As illustrated in FIG. 20, a second schematic block diagram of an access router according to an embodiment of the present invention is illustrated. The access router includes: a second notification module 2001 and a second sending module 2002.

The second notification module 2001 is configured to notify the second sending module 2002 when the access router of the second mobile node is switched to the third access router.

The first sending module 2002 is configured to send a context transfer message to the third access router after receiving the notification, the context transfer message including the home address of the second mobile node, as well as the home address and care-of address of a first mobile node that has established a session connection with the second mobile node.

This embodiment is applicable for the network-based mobility management scheme. Based on the Context Transfer Protocol, it enables the access router to transfer the address information of the mobile node associated with a session connection by the context transfer message directly during the switching, without the process in which the new access router inquires the routing manager, thereby reducing the delay caused by inquiring the routing manager, and thus decreasing the possibility of message lost.

The above embodiments are merely used to illustrate, not limit, the technical schemes of the present invention. Although the present invention has been illustrated in details with reference to the preferred embodiments, those with ordinary skills in the art should understand that: modifications to the embodiments or equivalents to part technical features of the present invention may be made without departing from the principle of the present invention. All such modifications and equivalents shall be within the scope of technical schemes as claimed by the present invention.

What is claimed is:

1. A route switching method for switching an access router of a second mobile node from a second access router to a third access router, the method comprising:

receiving, by the third access router, a context transfer message sent by the second access router, the context transfer message comprising an Internet Protocol (IP)-host address of the second mobile node, an IP-host address of a first mobile node and an IP-routing address of the first mobile node, wherein the first mobile node has an established session connection with the second mobile node;

updating, by the third access router, a Cache for Destination Terminal and a Cache for Source Terminal in a cache of the third access router according to the context transfer message, the Cache for Destination Terminal in the cache of the third access router including a mapping relation between the IP-host address of the first mobile node and the IP-routing address of the first mobile node, and the Cache for Source Terminal in the cache of the third access router including a mapping relation between the IP-host address of the second mobile node and an IP-routing address of the second mobile node;

performing IP in IP encapsulation, by the third access router, on a data packet when the second mobile node sends the data packet to the first mobile node via the third access router, with the IP-routing address of the first mobile node and the IP-routing address of the second mobile node being a destination address and a source address of an outer encapsulation respectively, and with a location update header being used in an outer IP packet, the location update header indicating the IP-host address and IP-routing address of the second mobile node; and sending the encapsulated data packet to a first access router which is connected to the first mobile node.

2. A route switching method for switching an access router of a second mobile node from a second access router to a third access router, the method comprising:

receiving, by the third access router, a context transfer message sent by the second access router, the context transfer message comprising a home address of the second mobile node, a home address of a first mobile node and a care-of address of the first mobile node, wherein the first mobile node has an established session connection with the second mobile node;

updating, by the third access router, a Cache for Destination Terminal and a Cache for Source Terminal in a cache of the third access router according to the context transfer message, the Cache for Destination Terminal in the cache of the third access router including a mapping relation between the home address of the first mobile node and the care-of address of the first mobile node, and the Cache for Source Terminal in the cache of the third access router including a mapping relation between the home address of the second mobile node and a care-of address of the second mobile node;

performing IP in IP encapsulation, by the third access router, on a data packet when the second mobile node sends the data packet to the first mobile node via the third access router, with the care-of address of the first mobile node and the care-of address of the second mobile node being a destination address and a source address of an outer encapsulation respectively, and with a location update header being used in an outer IP packet, the location update header indicating the home address of the second mobile node and the care-of address of the second mobile node; and sending the encapsulated data packet to a first access router.

3. A route switching system, comprising: a second access router, configured to send a context transfer message to a third access router when an access router of a second mobile node is switched from the second access router to the third access router, the context transfer message comprising an Internet Protocol (IP)-host address of the second mobile node, an IP-host address of a first mobile node and an IP-routing address of the first mobile node, the first mobile node having an established session connection with the second mobile node;

the third access router connected to the second access router, configured to update a Cache for Destination Terminal and a Cache for Source Terminal in a cache of the third access router according to the context transfer message, the Cache for Destination Terminal in the cache of the third access router including a mapping relation between the IP-host address of the first mobile node and the IP-routing address of the first mobile node, and the Cache for Source Terminal in the cache of the third access router including a mapping relation between the IP-host address of the second mobile node and an IP-routing address of the second mobile node, wherein the third access router is further configured to cache a data packet when the second mobile node sends the data packet to the first mobile node via the third access router;

update a mapping relation between the IP-routing address of the second mobile node and the IP-host address of the second mobile node in the third access router;

generate a new data packet by performing IP in IP encapsulation on a cached data packet wherein the IP-routing addresses of the first and second mobile nodes, respectively, are to be used as destination and source addresses, respectively, of an outer encapsulation, and a location update header, indicating the IP host address of the second mobile node and the IP routing address of the second mobile node, is used in the new data packet, and send the new data packet to a first access router, which is connected to the first mobile node.

4. A route switching system, comprising:

a second access router, configured to send a context transfer message to a third access router when an access router of a second mobile node is switched from the second access router to the third access router, the context transfer message comprising a home address of the second mobile node, a home address of a first mobile node and a care-of address of the first mobile node, the first mobile node having an established session connection with the second mobile node;

the third access router connected to the second access router, configured to update a Cache for Destination Terminal and a Cache for Source Terminal in a cache of the third access router according to the context transfer message, the Cache for Destination Terminal in the cache of the third access router including a mapping relation between the home address of the first mobile node and the care-of address of the first mobile node, and the Cache for Source Terminal in the cache of the third access router including a mapping relation between the home address of the second mobile node and a care-of address of the second mobile node, wherein the third access router is further configured to perform IP in IP encapsulation on a data packet when the second mobile node sends the data packet to the first mobile node via the third access router, with the care-of address of the first mobile node and the care-of address of the second mobile node being a destination address and a source address of outer encapsulation respectively, and with a location update header being used in an outer IP packet, the location update header indicating the home address of the second mobile node and the care-of address of the second mobile node; and send the encapsulated data packet to a first access router, which is connected to the first mobile node.

5. A route switching method for when an access router of a second mobile node is switched from a second access router to a third access router, the method comprising:

receiving, by the third access router, a context transfer message sent by the second access router, the context transfer message comprising an Internet Protocol (IP)-host address of the second mobile node, an IP-host address of a first mobile node and an IP-routing address of the first mobile node, wherein the first mobile node has an established session connection with the second mobile node;

updating, by the third access router, a Cache for Destination Terminal and a Cache for Source Terminal in a cache of the third access router according to the context transfer message, the Cache for Destination Terminal in the cache of the third access router including a mapping relation between the IP-host address of the first mobile node and the IP-routing address of the first mobile node, and the Cache for Source Terminal in the cache of the third access router including a mapping relation between the IP-host address of the second mobile node and an IP-routing address of the second mobile node;

caching, by the third access router, a data packet when the second mobile node sends the data packet to the first mobile node via the third access router;

updating the mapping relation between the IP-routing address of the second mobile node and the IP-host address of the second mobile node in the third access router through an activation process initiated by the second mobile node;

generating, by the third access router, a new data packet, by performing IP in IP encapsulation on a cached data packet wherein the IP-routing addresses of the first and second mobile nodes, respectively, are to be used as destination and source addresses, respectively, of an outer encapsulation, and a location update header, indicating the IP host address of the second mobile node and the IP routing address of the second mobile node, is used in the new data packet; and sending the new data packet to the first access router.

6. The route switching method of claim 5, wherein the generating comprises:

adding, by the third access router, the location update header indicating the IP-host address of the second mobile node and the IP-routing address of the second mobile node into a header of the cached data packet.

* * * * *